(12) United States Patent
Seidel

(10) Patent No.: US 11,243,392 B2
(45) Date of Patent: Feb. 8, 2022

(54) METHOD FOR DETERMINING AN IMAGING FUNCTION OF A MASK INSPECTION MICROSCOPE, AND MASK INSPECTION MICROSCOPE

(71) Applicant: Carl Zeiss SMT GmbH, Oberkochen (DE)

(72) Inventor: Dirk Seidel, Jena-Leutra (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 16/884,219

(22) Filed: May 27, 2020

(65) Prior Publication Data
US 2020/0379237 A1   Dec. 3, 2020

(30) Foreign Application Priority Data
May 28, 2019 (DE) .......................... 102019114272.5

(51) Int. Cl.
*G02B 21/36* (2006.01)
*G02B 21/08* (2006.01)

(52) U.S. Cl.
CPC .......... *G02B 21/367* (2013.01); *G02B 21/086* (2013.01)

(58) Field of Classification Search
CPC ............................ G02B 21/367; G02B 21/086
See application file for complete search history.

(56) References Cited

U.S. PATENT DOCUMENTS

| 6,177,277 B1 | 1/2001 | Soini |
| 8,694,929 B2 | 4/2014 | Seidel et al. |

(Continued)

FOREIGN PATENT DOCUMENTS

| DE | 69628542 | 12/2003 | ............. G01N 21/64 |
| DE | 102010047050 | 3/2012 | ............... G03F 1/00 |
| DE | 102016218452 | 3/2018 | ............. G01B 11/14 |

OTHER PUBLICATIONS

German Office Action for German Application No. DE 10 2019 114 272.5 by Examiner Dr. Armelle Mittermeier, dated Apr. 3, 2020.
(Continued)

*Primary Examiner* — Jared Walker
(74) *Attorney, Agent, or Firm* — Fish & Richardson P.C.

(57) ABSTRACT

The invention relates to a method for determining an imaging function of a mask inspection microscope, wherein the mask inspection microscope comprises an imaging optical element, a tube, a recording device, an object stage, an illumination unit for measurement with transmitted light and an illumination unit for measurement in reflection, comprising the following method steps: a) measuring the intensities in the pupil plane of the imaging optical element in a reflective measurement, b) measuring the intensities in the pupil plane of the imaging optical element in a transmitted-light measurement, d) Determining the imaging function of the intensities of the imaging optical element, d) determining the imaging function of the intensities of the illumination optical element comprised in the illumination unit for the transmitted-light measurement.

Furthermore, the invention relates to a mask inspection microscope for determining the deviation of an actual structure from a desired structure on an object, comprising an imaging optical element, a tube, a recording device, an additional optical module, an illumination unit for measurement with transmitted light, an illumination unit for measurement in reflection, and an object stage, wherein the object stage is configured to move to a position with a deviation of less than 100 nm, in particular of less than 20 nm, a calculation unit, in which the calculation unit is configured to calibrate the mask inspection microscope.

19 Claims, 6 Drawing Sheets

(56) References Cited

U.S. PATENT DOCUMENTS

| | | | |
|---|---|---|---|
| 9,786,046 B2 | 10/2017 | Arnz et al. | |
| 2012/0075456 A1* | 3/2012 | Seitz | G01B 11/02 |
| | | | 348/79 |
| 2012/0162755 A1* | 6/2012 | Stroessner | G02B 21/086 |
| | | | 359/386 |
| 2017/0018064 A1* | 1/2017 | Seidel | G06T 7/74 |
| 2018/0089817 A1 | 3/2018 | Blumrich | |

OTHER PUBLICATIONS

*Handbook of Optics*, vol. 2, by Michael Bass, Optical Society of America, Chapter 17, pp. 17.39-17.40, by McGraw-Hill, Inc. (1978).

\* cited by examiner

METHOD FOR DETERMINING AN IMAGING FUNCTION OF A MASK INSPECTION MICROSCOPE, AND MASK INSPECTION MICROSCOPE

CROSS-REFERENCE TO RELATED APPLICATIONS

This application claims priority under 35 U.S.C. § 119 from German Application 10 2019 114 272.5, filed on May 28, 2019, the entire contents of which are incorporated herein by reference.

TECHNICAL FIELD

The invention relates to a method for determining an imaging function of a mask inspection microscope, and to a mask inspection microscope.

BACKGROUND

Photolithographic masks are used in lithography systems or for producing microstructured components, such as integrated circuits or LCDs (liquid crystal displays). In a lithography process or a microlithography process, an illumination unit illuminates a photolithographic mask, which is also referred to as photomask or simply mask. The light passing through the mask or the light reflected by the mask is projected, by means of a projection optical element, onto a substrate (e.g. a wafer) which is coated with a light-sensitive layer (photoresist) and arranged in the image plane of the projection optical element in order to transfer the structure elements of the mask onto the light-sensitive coating of the substrate and thus to produce a desired structure on the substrate.

The positioning of structure elements on the surface of masks must be highly accurate, such that the deviations from the predetermined positions thereof or deviations from a critical dimension (CD) of a structure element lie in the nanometer range so as not to lead to errors on wafers during the exposure with the corresponding mask. The production of photomasks which can meet these requirements is extremely complex, susceptible to errors and hence expensive. Therefore, masks must be repaired whenever possible.

An important precondition for repairing defective masks is the finding and characterization of defects which are present, in particular of positioning defects or positioning errors ("registration errors" or simply "registration"). The detection of positioning defects and/or deviations of the CD is complicated and difficult as these dimensions need to be established with an accuracy in the single-digit nanometer range, preferably in the sub-nanometer range.

Use is made of mask inspection microscopes or position determining devices in order to examine positioning errors and/or the CD value. Two different groups of methods can be used for measuring structures or structure elements on a mask:

(a) Evaluation methods which measure an image of the structure elements in absolute terms with respect to a reference point.

(b) Evaluation methods which measure the image of structure elements relatively, i.e. which relate it to a reference image.

The U.S. Pat. No. 8,694,929 B2 describes for example a method in which a reference image is likewise used. The method disclosed therein involves taking account of the inadequate knowledge of the parameters by way of parameter scans, wherein ultimately the reference image having the best correspondence always continues to be used.

Furthermore, the US patent application US 2017 0018064 A1 relates to a method for determining the deviation of the position of a structure by (a) Providing a measured reference image of the at least one structure element; (b) Deriving a data set containing the measured reference image, said data set comprising metadata relating to the measured reference image; (c) Providing at least one measured image of the at least one structure element; and (d) Optimizing the measured reference image by means of the derived data set and correlating the at least one measured image and the optimized measured reference image. The described optimization of the reference image has the disadvantage that it is very complex and does not take into account, or takes into account only indirectly, the intrinsic imaging aberrations of the imaging optical element of the mask inspection microscope or of the position determining device.

In addition, the U.S. Pat. No. 9,786,046 B2 discloses a method which involves ascertaining the lateral offset of a pattern by measurement and simulation of the imaging of the pattern in different equidistant defocus positions. A defocus position is understood to mean a position of the mask above or below the focal plane of the imaging optical element. For each defocus position, a lateral offset is determined from the measured and simulated image pairs and a fit straight line is placed through the lateral offsets of all the patterns of each defocus position. As a result, at least the imaging aberrations of the imaging optical element which are dependent on the defocus position can be ascertained and taken into account in the measurement of the pattern. The described determination of the imaging aberrations of the imaging optical element has the disadvantage, however, that it is very complex and detects only a portion of the imaging aberrations of the optical recording unit.

SUMMARY

One of the features of the present invention is to specify an improved method for determining an imaging function of a mask inspection microscope. Another feature of the invention is to provide a device which solves the problems of the prior art.

A method according to the invention for determining an imaging function of a mask inspection microscope having an imaging optical element, a tube, a recording device, an object stage, an illumination unit for measurement with transmitted light and an illumination unit for measurement in reflection comprises the following method steps:

a) Measuring the intensity distribution in the pupil plane of the imaging optical element in a reflective measurement, b) Measuring the intensity distribution in the pupil plane of the imaging optical element in a transmitted-light measurement, c) Determining the imaging function of the intensities of the imaging optical element, d) Determining the imaging function of the intensities of the illumination optical element used for the transmitted-light measurement in the illumination unit.

The measurement of the pupil plane encompasses the influences of all optical elements arranged in the measurement beam path during the measurement. During the measurement in reflection, said elements, in the order of transmission or reflection, are a semitransparent mirror in reflection, the imaging optical element, the object as reflective optical element, once again the imaging optical element in the opposite direction, the semitransparent mirror in transmission, and the tube. During a measurement in transmission, said elements are the illumination optical element embodied as a condenser, the object in transmission, the imaging optical element, the semitransparent mirror in transmission, and the tube. The pupil can be imaged on the recording device, embodied as a CCD camera, for example.

In particular, the imaging function of the intensities of the imaging optical element can be determined on the basis of the intensities of the reflection measurement. In the case of a measurement of the pupil in reflection ($Pup_R$), the recording device measures the intensity distribution over the pupil as a sum of the contributions of all the optical elements in the beam path, with passage through the imaging optical element twice. Assuming that the contributions of the semitransparent mirror, of the object itself and of the tube can be disregarded, this yields the following formula for the intensity distribution in the pupil $Pup_R$:

$$Pup_R = F_{imaging\ optical\ element} * F_{rot\ 180(imaging\ optical\ element)},$$

wherein $F_{imaging\ optical\ element}$ denotes the imaging function of the intensities upon passage from the object in the direction of the recording device and $F_{rot180(imaging\ optical\ element)}$ denotes the imaging function of the intensities upon passage of the measurement light from the semitransparent mirror to the object of the imaging optical element. Here the imaging function describes in each case the change in a constant intensity distribution during passage through the imaging optical element.

Assuming that the optical surfaces of the optical elements, such as, for example, lens elements or mirrors, of the imaging optical element are embodied as rotationally symmetrical and the change in the imaging properties of the optical elements over the angle is negligible, this yields the following for $Pup_R$:

$$Pup_R = F_{imaging\ optical\ element} * F_{imaging\ optical\ element} = (F_{imaging\ optical\ element})^2$$

This yields the following formula for the imaging function of the intensities of the imaging optical element $F_{imaging\ optical\ element}$:

$$F_{imaging\ optical\ element} = \mathrm{sqrt}(Pup_R)$$

Furthermore, the imaging function of the intensities of the illumination optical element used in the illumination unit for the transmitted-light measurement can be determined on the basis of the imaging function already known from the reflection measurement for the imaging optical element and a transmitted-light measurement. For the change in the intensity distribution in the pupil as a result of the sum of the contributions of all optical elements in the beam path in the case of the transmitted-light measurement ($Pup_T$), that is to say the imaging function of the intensities of the illumination optical element, the following formula arises under the same assumption as described further above:

$$Pup_T = F_{illumination} * F_{imaging\ optical\ element},$$

wherein $F_{illumination}$ denotes the imaging function of the illumination optical element upon passage from the light source in the direction of the object.

By inserting the already ascertained $F_{imaging\ optical\ element}$ into the measured $Pup_T$ and solving it with respect to $F_{illumination}$, this yields the following for the imaging function $F_{illumination}$:

$$F_{illumination} = Pup_T / \mathrm{sqrt}(Pup_R)$$

Furthermore, the imaging functions of the intensities of the imaging optical element $F_{imaging\ optical\ element}$ and of the illumination optical element $F_{illumination}$ can be converted into imaging functions for amplitudes by root extraction. These can subsequently be weighted by means of normalization, for example. The amplitudes in the pupil plane of imaging and illumination correspond in the simulation to the weighting of the corresponding diffraction angles (imaging) or illumination angles (illumination). This weighting is part of a standard image simulation of a partially coherent imaging system, e.g. by way of Abbe sum or Transfer Cross Coefficient (TCC).

For measuring the intensity distribution in the pupil plane, by way of example, an additional optical module can be pivoted into the beam path of the mask inspection microscope. Said module can be embodied for example as a so-called Bertrand optical element, as is described for example in the Handbook of Optics, Vol. 2, Chapter 17, Page 17.39. With continued use of the normal imaging beam path of the optical imaging system, this allows the pupil to be imaged into the image plane—provided anywhere in the optical imaging system—on the recording device. The contribution of the Bertrand optical element is also disregarded in the methods described above.

Furthermore, an object for calibration in method steps a) and b) can have the same thickness as an object to be measured, such as a photomask, for example. This has the advantage that, particularly during the transmitted-light measurement, the beam path at the object is influenced identically within the scope of the tolerances of the material properties of the measured objects.

In particular, the measurements can be carried out at a location of the object for calibration without structures. This has the advantage that only the contributions of the optical elements in the beam path influence the intensity measurement in the pupil and these include no errors originating from imaged structures.

In a further embodiment of the invention, the deviation of an actual structure from the associated desired structure on an object can be determined, wherein this method, besides the method steps described further above, can comprise the following additional method steps:

e) Measuring an actual structure using the mask inspection microscope, f) Simulating the imaging of the desired structure taking account of the imaging functions of the imaging optical element and/or the illumination optical element, g) Ascertaining the deviation of the imaging of the structure from the measurement of the actual structure from the simulated imaging obtained by means of the simulation of the desired structure.

For example, measuring the actual structure using the mask inspection microscope can include imaging of the actual structure, in which it is possible to measure dimensions and positions by analyzing the image(s) taken.

The measurement of the actual structure comprising structures is dependent on the position of the object stage, for which reason the latter can be configured to move to a position with a deviation of less than 100 nm, in particular of less than 20 nm. This has the advantage that the imaging aberrations brought about by a position error of the object stage can be reduced to a minimum.

In particular, the deviation between actual structure and desired structure can be determined by forming the difference between the measurement and the simulation.

The method according to the invention can contribute in particular to correcting "lens heating," that is to say imaging aberrations originating from the heating of optical elements, or other operation-based errors in the simulation.

A mask inspection microscope according to the invention for determining the deviation of an actual structure from a desired structure on an object comprises an imaging optical element, a tube, a recording device, a Bertrand optical element, an illumination unit for measurement with transmitted light, an illumination unit for measurement in reflection, and an object stage, wherein the object stage is configured to move to a position with a deviation of less than 100 nm, in particular of less than 20 nm. Furthermore, the mask inspection microscope comprises a calculation unit, wherein the calculation unit is configured to calibrate the mask inspection microscope.

In particular, the calibration of the mask inspection microscope can be carried out according to steps a) to d) of the method described further above.

BRIEF DESCRIPTION OF DRAWINGS

Exemplary embodiments and variants of the invention are explained in more detail below with reference to the drawing. In the figures.

DETAILED DESCRIPTION

Figure 1:
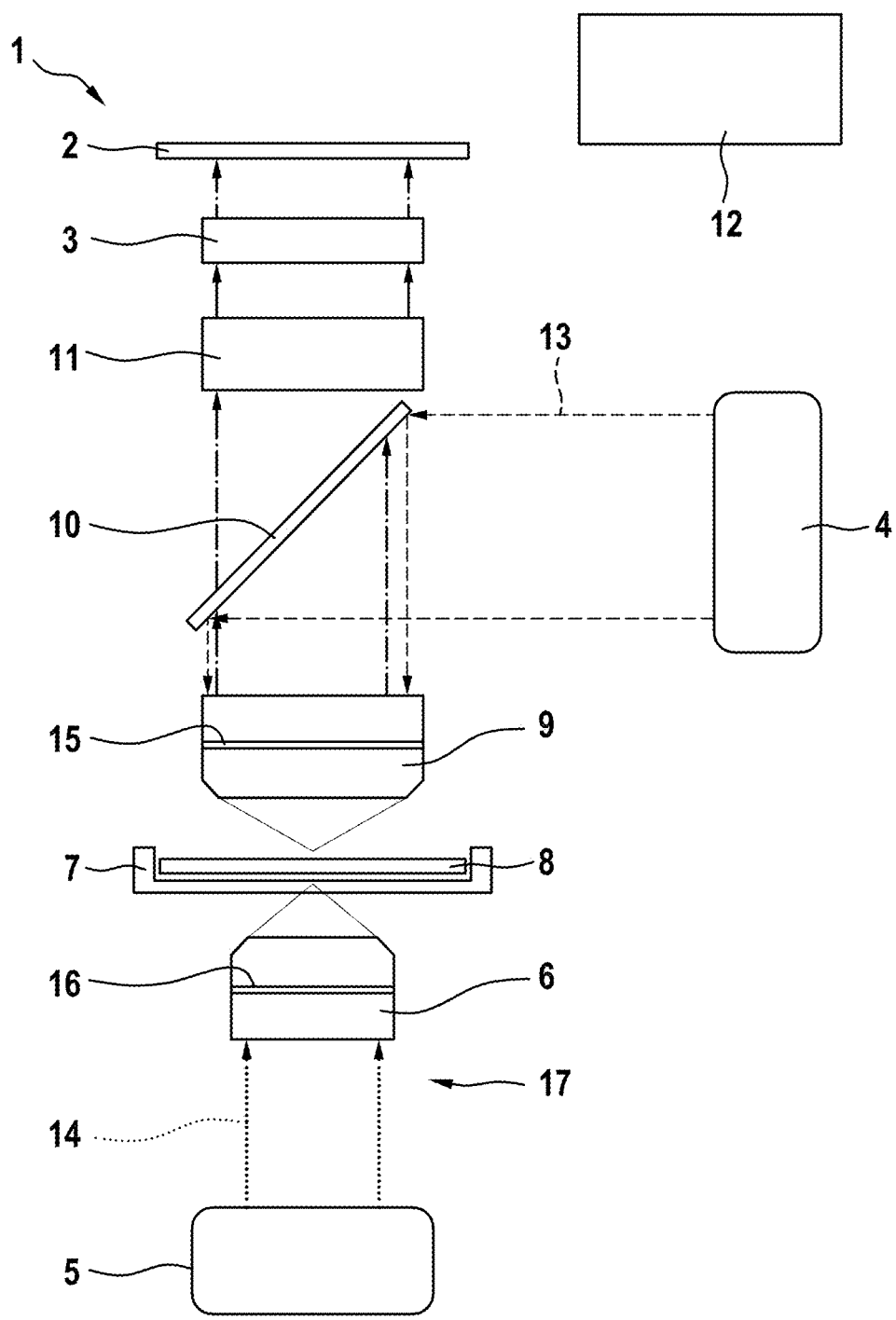
FIG. 1 shows a schematic illustration of a mask inspection microscope.

FIG. 1 shows a schematic illustration of a mask inspection microscope 1 for measuring an object 8, which can be embodied as a photomask, for example. The mask inspection microscope 1 comprises two light sources 4, 5, wherein a first light source 4 is configured for a measurement of the object 8 in reflection and a second light source 5 is configured for a measurement of the object 8 in transmitted light. The object 8 is arranged on an object stage 7, which can position the object 8 laterally and vertically in the sub-nanometer range. In this case, the positional accuracy can be in particular in a range of less than 100 nm, in particular less than 20 nm. During a transmitted-light measurement, the measurement light 14 of the illumination unit 17, which comprises the light source 5 and an illumination optical element embodied as a condenser 6, passes through the condenser 6, which generates a desired light distribution on the object 8. The pupil plane of the illumination optical element 6 is designated by the reference numeral 16 in the figure. The measurement light 14 passes further through the object 8, which is subsequently imaged by an imaging optical element 9 and a tube 11. For example, the imaging optical element 9 is a microscope lens. The tube 11 magnifies the imaging of the object 8 and images it in turn on a recording device 2 embodied as a CCD camera. The semitransparent mirror 10 arranged between the imaging optical element 9 and the tube 11 is used for the measurement in reflection and has no influence on the measurement in transmitted light.

During a measurement in reflection, the measurement light 13 emitted by the light source 4 is reflected at the semitransparent mirror 10 and then impinges on the imaging optical element 9. The latter focuses the measurement light 13 on the object 8, from which it is reflected. The measurement light 13 passes once more through the imaging optical element 9 and the latter images the object 8 through the semitransparent mirror 10 on the tube 11. The tube 11 magnifies the imaging of the object 8 and images it on the recording device 2.

For characterizing the imaging functions of the condenser 6 ($F_{illumination}$) and of the imaging optical element 9 ($F_{imaging\ optical\ element}$), between the recording device 2 and the tube 11, an additional optical module 3, such as, for example, in the form of a Fresnel zone plate, a so-called Bertrand optical element 3, can optionally be pivoted into the beam path of the mask inspection microscope 1. This has the effect that what is imaged onto the recording device 2 is no longer the object 8, but rather the pupil 15 of the imaging optical element 9. The pupil 15 encompasses the influences of all the optical components involved in the imaging, that is to say in particular of the condenser 6 and/or of the imaging optical element 9. In the case of a measurement in reflection, the recording device 2 measures the intensities of the pupil 15 (PupR), with passage through the imaging optical element 9 twice, which yields the following formula for PupR:

$$PupR = F_{imaging\ optical\ element} * F_{rot\ 180(imaging\ optical\ element)},$$

wherein $F_{imaging\ optical\ element}$ denotes the imaging function of the imaging optical element 9 upon passage of the measurement light 13 from the object 8 in the direction of the CCD camera 2 and $F_{rot180(imaging\ optical\ element)}$ denotes the imaging function of the imaging optical element 9 upon passage of the measurement light 13 from the semitransparent mirror 10 to the object 8. For example, PupR, $F_{imaging\ optical\ element}$, and $F_{rot\ 180(imaging\ optical\ element)}$ can be two-dimensional functions, e.g., $PupR(x,y) = F_{imaging\ optical\ element}(x,y) * F_{rot\ 180(imaging\ optical\ element)}(x,y)$.

The following relationship arises for the intensities in the pupil 15 during the transmitted-light measurement ($Pup_T$):

$$Pup_T = F_{illumination} * F_{imaging\ optical\ element},$$

wherein $F_{illumination}$ denotes the imaging function of the condenser 6 upon passage from the light source 5 in the direction of the object 8. For example, PupT, $F_{illumination}$, and $F_{imaging\ optical\ element}$ can be two-dimensional functions, e.g., $PupT(x,y) = F_{illumination}(x,y) * F_{imaging\ optical\ element}(x,y)$.

Assuming that the optical surfaces of the optical elements, such as, for example, lens elements or mirrors, of the imaging optical element 9 are embodied as rotationally symmetrical and the change in the imaging aberrations of the optical elements over the angle is negligible and the influence of the semitransparent mirror 10, of the object 8 itself, of the Bertrand optical element 3 and of the tube 11 can likewise be disregarded, this yields the following for $Pup_R$:

$$Pup_R = F_{imaging\ optical\ element} * F_{imaging\ optical\ element} = (F_{imaging\ optical\ element})^2$$

This yields the following formula for the imaging function of the intensities of the imaging optical element 9:

$$F_{imaging\ optical\ element} = \operatorname{sqrt}(Pup_R)$$

This inserted into $Pup_T$ and solved with respect to $F_{illumination}$ yields the following for the imaging function of the intensities $F_{illumination}$:

$$F_{illumination} = Pup_T / \operatorname{sqrt}(Pup_R)$$

These imaging functions relate to the intensities measured in the pupil 15, that is to say to the light power per unit area (e.g., $F_{illumination}$ and $F_{imaging\ optical\ unit}$ are related to $Pup_T$ and $Pup_R$ according to the formulas above). The processing of data described above, such as the calculation of $F_{illumination}$ based on $Pup_T$ and $Pup_R$, can be performed by, e.g., the calculation unit 12.

Furthermore, the imaging functions of the intensities of the imaging optical element 9 $F_{imaging\ optical\ element}$ and of the illumination optical element 6 $F_{illumination}$ can be converted into imaging functions for amplitudes by root extraction. These can subsequently be weighted by means of normalization, for example. The amplitudes in the pupil plane of imaging and illumination correspond in the simulation to the weighting of the corresponding diffraction angles (imaging) or illumination angles (illumination). This weighting is part of a standard image simulation of a partially coherent imaging system, e.g. by way of Abbe sum or Transfer Cross Coefficient (TCC).

Figure 2A:
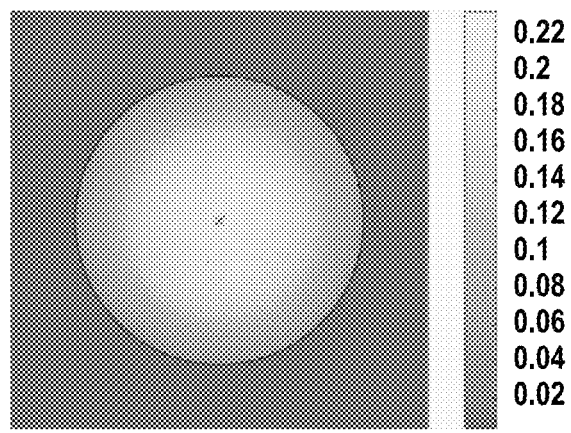
FIGS. 2A-2F show schematic illustrations concerning intensity distributions.
Figure 2B:
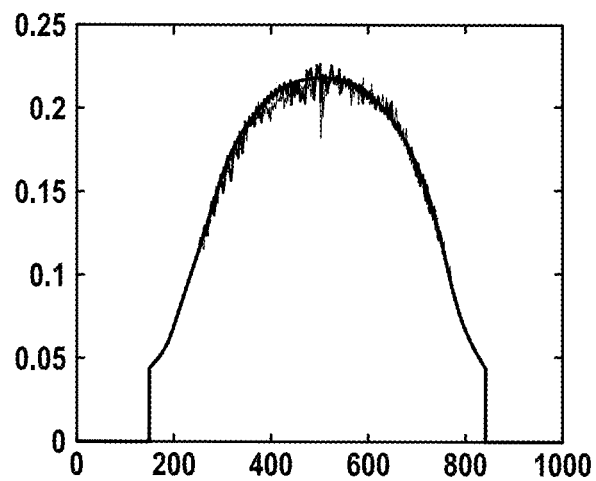
Figure 2C:
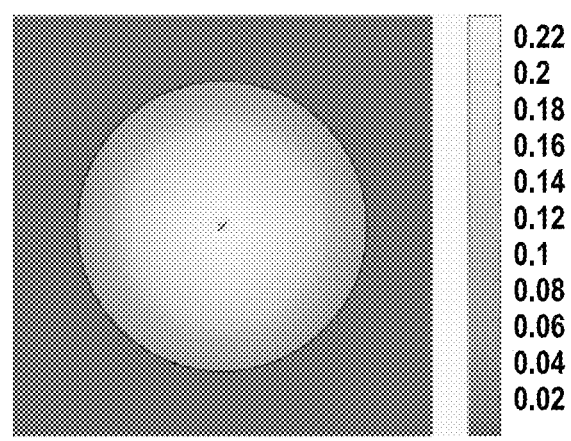
Figure 2D:
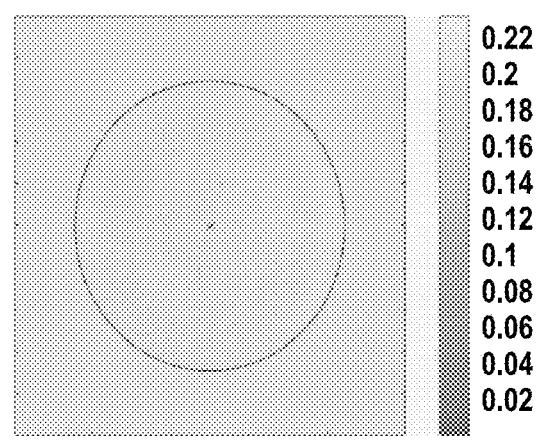
Figure 2E:
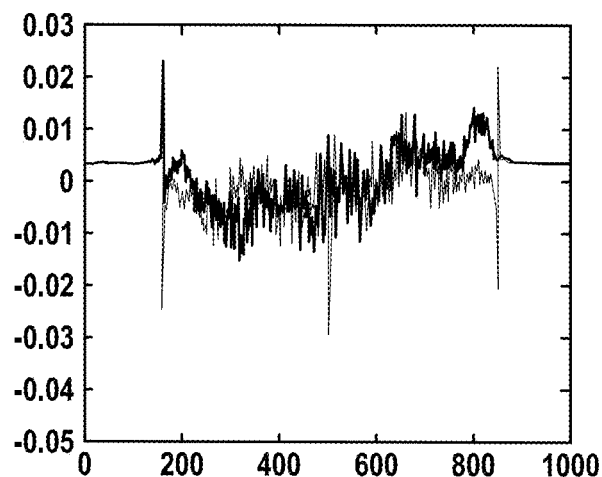
Figure 2F:
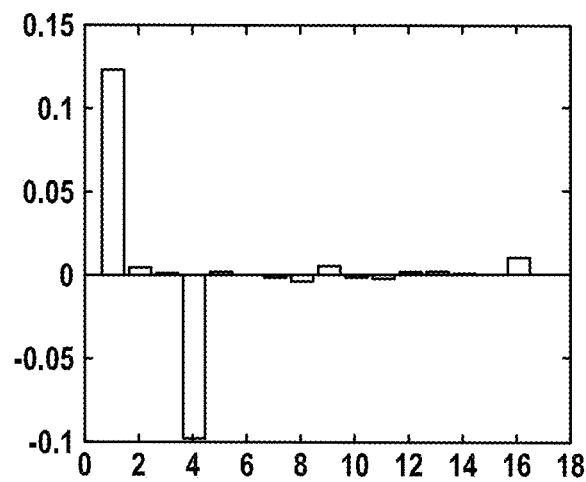
Figure 3A:
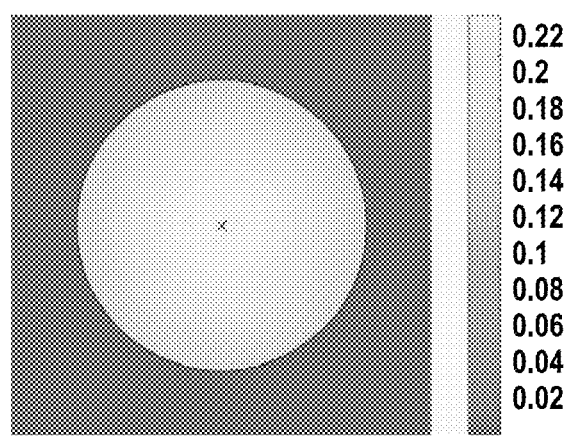
FIGS. 3A-3C show schematic illustrations of amplitudes of an imaging function.
Figure 3B:
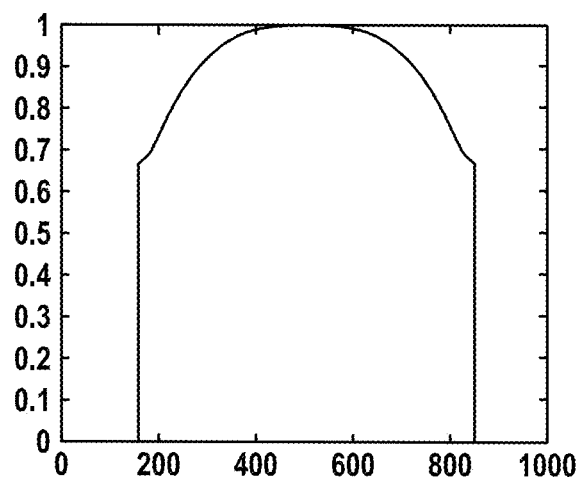
Figure 3C:
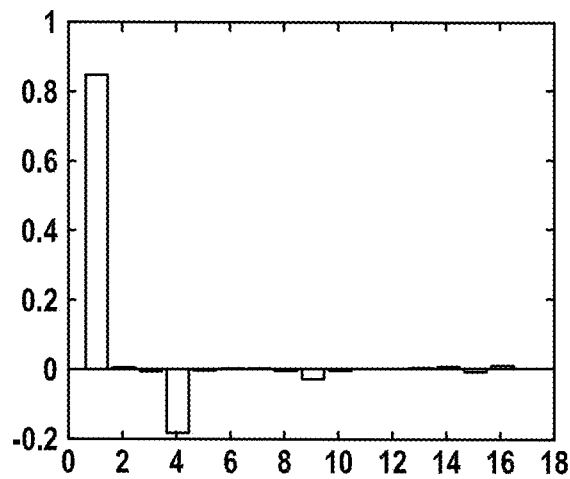

FIGS. 2A-2F show schematic illustrations concerning intensity distributions. FIG. 2A shows an intensity distribution of a measurement in reflection in a greyscale-coded 2D representation, the segment of the measured object 8 comprising no structures, with the result that only the influences of the imaging optical element 9 affect the imaging. FIG. 2B shows a diagram illustrating a section through the intensity distribution from one edge of the optically active region to the other through the optical axis, the optical axis lying at the value 500 of the abscissa in FIG. 2B. The diameter is plotted on the abscissa and the intensity is plotted on the ordinate. FIG. 2C illustrates the intensity distribution that is simulated on the basis of the method described above. FIG. 2D shows the difference between the measured intensities in FIG. 2A and the simulated intensities in FIG. 2C as a greyscale-coded 2D representation. FIG. 2E shows the difference from FIG. 2D as a diagram, wherein the diameter of the pupil from one edge of the optically active region to the other through the optical axis is plotted on the abscissa and the deviation between measurement and simulation is plotted on the ordinate. FIG. 2F shows the coefficients of the individual Zernike polynomials that were used for the simulation of the intensities illustrated in FIG. 2C, wherein the number of the Zernike polynomial is plotted on the abscissa and the value of the respective coefficient is plotted on the ordinate. FIG. 3A shows the amplitudes—already normalized to 1—of the imaging function of the imaging optical element 9 in a greyscale-coded 2D representation. FIG. 3B shows a section through the imaging function from one edge of the optically active region to the other through the optical axis, the optical axis lying at the value 500 of the abscissa. FIG. 3C shows in turn the weighted contributions of the individual Zernike polynomials of the imaging function.

Figure 4A:
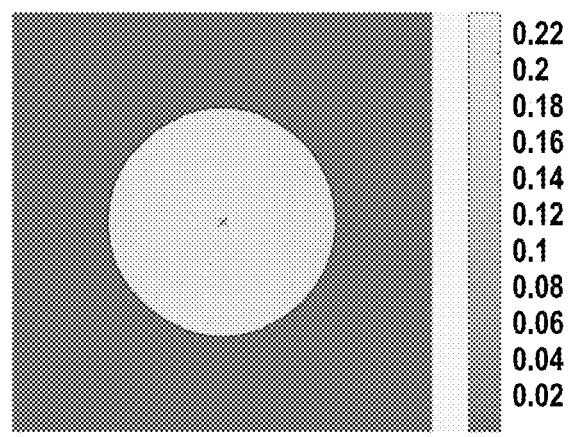
FIGS. 4A-4C show schematic illustrations of the amplitudes of a further imaging function.
Figure 4B:
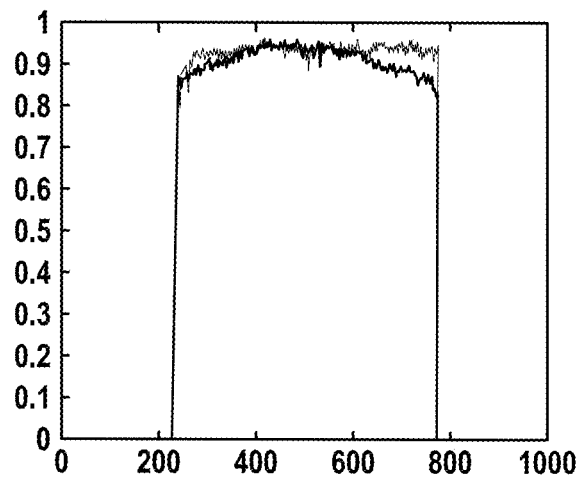
Figure 4C:
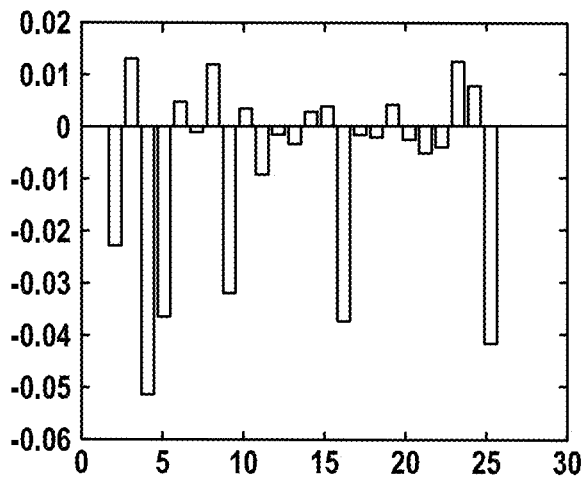

FIG. 4A shows the amplitudes—already normalized to 1—of the condenser 6 in a greyscale-coded 2D representation. FIG. 4B shows a section through the imaging function from one edge of the optically active region to the other through the optical axis, the optical axis lying at the value 500 of the abscissa. FIG. 4C in turn shows the weighted contributions of the individual Zernike polynomials of the imaging function of the illumination optical element, that is to say of the condenser. The smaller diameter is attributable to the smaller numerical aperture of the condenser 6 in comparison with the imaging optical element 9.

Figure 5:
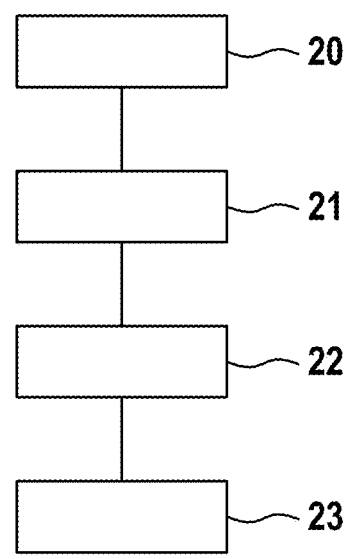
FIG. 5 shows a flow diagram concerning a method according to the invention.

FIG. 5 shows one possible method by which the imaging function of the imaging optical element and of the illumination optical element can be determined.

A first method step 20 involves measuring the intensity distribution in the pupil plane 15 of the imaging optical element 9 in a reflective measurement.

A second method step 21 involves measuring the intensity distribution in the pupil plane 15 of the imaging optical element 9 in a transmitted-light measurement.

A third method step 22 involves determining the imaging functions of the intensities of the imaging optical element 9.

A fourth method step 23 involves determining the imaging functions of the intensities of the illumination optical element 6 for the transmitted-light measurement.

In some implementations, the calculation unit 12 (FIG. 1) can include one or more data processors for processing data, one or more storage devices for storing data, such as one or more databases, and/or one or more computer programs including instructions that when executed by the calculation unit causes the calculation unit to carry out the processes. The calculation unit can include one or more input devices, such as a keyboard, a mouse, a touchpad, and/or a voice command input module, and one or more output devices, such as a display, and/or an audio speaker. The calculation unit can show graphical user interfaces on the display to assist the user of the mask inspection microscope 1.

In some implementations, the calculation unit can include digital electronic circuitry, computer hardware, firmware, software, or any combination of the above. The features related to processing of data can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

In some implementations, the operations associated with processing of data described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment.

For example, the calculation unit is configured to be suitable for the execution of a computer program and can include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

In some implementations, the processes for determining the imaging function of a mask inspection microscope described above can be implemented using software for execution on one or more mobile computing devices, one or more local computing devices, and/or one or more remote computing devices. For instance, the software forms procedures in one or more computer programs that execute on one or more programmed or programmable computer systems, either in the mobile computing devices, local computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port.

In some implementations, the software may be provided on a medium, such as a CD-ROM, DVD-ROM, or Blu-ray disc, readable by a general or special purpose programmable computer or delivered (encoded in a propagated signal) over a network to the computer where it is executed.

The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

LIST OF REFERENCE SIGNS

1 Mask inspection microscope
2 Recording device, CCD camera
3 Optical module, Bertrand optical element
4 Light source for reflection
5 Light source for transmitted light
6 Condenser
7 Object stage
8 Object
9 Imaging optical element
10 Mirror
11 Tube
12 Calculation unit
13 Beam path of reflection
14 Beam path of transmitted light
15 Pupil of imaging optical element
16 Pupil of condenser
17 Illumination unit
20 Method step 1
21 Method step 2
22 Method step 3
23 Method step 4

What is claimed is:

1. A method for determining an imaging function of a mask inspection microscope, wherein the mask inspection microscope comprises an imaging optical element, a tube, a recording device, an object stage, an illumination unit for measurement with transmitted light and an illumination unit for measurement in reflection, comprising the following method steps:
   a) measuring the intensities in the pupil plane of the imaging optical element in a reflective measurement,
   b) measuring the intensities in the pupil plane of the imaging optical element in a transmitted-light measurement,
   c) determining the imaging function of the intensities of the imaging optical element, and
   d) determining the imaging function of the intensities of an illumination optical element used for the transmitted-light measurement in the illumination unit.

2. The method according to claim 1, wherein the imaging function of the intensities of the imaging optical element is determined on the basis of the reflection measurement.

3. The method according to claim 1, wherein the imaging function of the intensities of the illumination optical element is determined on the basis of the reflection measurement and the transmitted-light measurement.

4. The method according to claim 1, wherein the imaging functions of the intensities are converted into imaging functions of amplitudes.

5. he method according to claim 4, wherein the amplitudes are normalized for weighting purposes.

6. The method according to claim 1, wherein for measuring the intensity distribution in the pupil plane, an additional optical module is pivoted into the beam path of the mask inspection microscope.

7. The method according to claim 1, wherein an object for calibration in method steps a) and b) has the same thickness as an object to be measured.

8. the method according to claim 7, wherein the measurements are carried out at a location of the object for calibration without structures.

9. A method for determining deviations of an actual structure from the associated desired structure on an object, wherein an imaging function of a mask inspection microscope was determined according to claim 1, comprising the following additional method steps:
   e) measuring an actual structure using the mask inspection microscope,
   f) simulating the imaging of the desired structure taking account of the imaging functions of the imaging optical element and/or the illumination optical element, g) ascertaining the deviation of the imaging of the structure from the measurement of the actual structure from the simulated imaging obtained by use of the simulation of the desired structure.

10. The method according to claim 9, wherein the object stage is configured to move to a position with a deviation of less than 100 nm, in particular of less than 20 nm.

11. The method according to claim 10, wherein the deviation is determined by forming the difference between the measurement and the simulation.

12. A mask inspection microscope for determining the deviation of an actual structure from a desired structure on an object, comprising:
   an imaging optical element,
   a tube,
   a recording device,
   an additional optical module,
   an illumination unit for measurement with transmitted light,
   an illumination unit for measurement in reflection,
   an object stage, wherein the object stage is configured to move to a position with a deviation of less than 100 nm, in particular of less than 20 nm, and
   a calculation unit,
   wherein the calculation unit is configured to calibrate the mask inspection microscope;
   wherein the calculation unit is configured to carry out the calibration of the mask inspection microscope according to the following steps:
   a) measuring the intensities in the pupil plane of the imaging optical element in a reflective measurement,
   b) measuring the intensities in the pupil plane of the imaging optical element in a transmitted-light measurement,
   c) determining the imaging function of the intensities of the imaging optical element, and
   d) determining the imaging function of the intensities of the illumination optical element used for the transmitted-light measurement in the illumination unit.

13. The mask inspection microscope of claim 12 in which the imaging function of the intensities of the illumination optical element is determined based on the measured intensities in the pupil plane of the imaging optical element in the reflective measurement and the measured intensities in the pupil plane of the imaging optical element in the transmitted-light measurement.

14. The mask inspection microscope of claim 13 in which the imaging function of the intensities of the illumination optical element is determined based on a formula $F_{illumination} = Pup_T / sqrt(Pup_R)$, $F_{illumination}$ represents the imaging function of the intensities of the illumination optical element, $Pup_T$ represents the measured intensities in the pupil plane of the imaging optical element in the transmitted-light measurement, and $Pup_R$ represents the measured intensities in the pupil plane of the imaging optical element in the reflective measurement.

15. The mask inspection microscope of claim 12 in which the calculation unit is configured to determine deviations of an actual structure from the associated desired structure on an object according to the following additional steps: e) determining a measured actual structure, f) simulating the imaging of the desired structure taking account of the imaging functions of the imaging optical element and/or the illumination optical element, and g) ascertaining the deviation of the imaging of the structure from the measurement of the actual structure from the simulated imaging obtained by use of the simulation of the desired structure.

16. The method of claim 1 in which the imaging function of the intensities of the illumination optical element is determined based on the measured intensities in the pupil plane of the imaging optical element in the reflective measurement and the measured intensities in the pupil plane of the imaging optical element in the transmitted-light measurement.

17. The method of claim 16 in which the imaging function of the intensities of the illumination optical element is determined based on a formula $F_{illumination} = Pup_T / sqrt(Pup_R)$, $F_{illumination}$ represents the imaging function of the intensities of the illumination optical element, $Pup_T$ represents the measured intensities in the pupil plane of the imaging optical element in the transmitted-light measurement, and $Pup_R$ represents the measured intensities in the pupil plane of the imaging optical element in the reflective measurement.

18. The method of claim 2 in which the imaging function of the intensities of the illumination optical element is determined on the basis of the reflection measurement and the transmitted-light measurement.

19. The method of claim 2 in which for measuring the intensity distribution in the pupil plane, an additional optical module is pivoted into the beam path of the mask inspection microscope.

* * * * *

UNITED STATES PATENT AND TRADEMARK OFFICE
CERTIFICATE OF CORRECTION

PATENT NO. : 11,243,392 B2
APPLICATION NO. : 16/884219
DATED : February 8, 2022
INVENTOR(S) : Dirk Seidel It is certified that error appears in the above-identified patent and that said Letters Patent is hereby corrected as shown below:

On the Title Page

Item [57]
Column 2, Line 11, delete "d) Determining" and insert -- c) determining --

In the Specification

Column 3
Line 23, delete "$F_{rot180}$" and insert -- $F_{rot\ 180}$ --

Column 6
Line 20, delete "(PupR)," and insert -- $(Pup_R)$, --
Line 22, delete "PupR:" and insert -- $Pup_R$: --
Line 23, delete "PupR" and insert -- $Pup_R$ --
Line 28, delete "$F_{rot180}$" and insert -- $F_{rot\ 180}$ --
Line 31, delete "PupR," and insert -- $Pup_R$, --
Line 33, delete "PupR" and insert -- $Pup_R$ --
Line 38, delete "PupT" and insert -- $Pup_T$ --
Line 41, delete "PupT," and insert -- $Pup_T$, --
Line 43, delete "PupT" and insert -- $Pup_T$ --

In the Claims

Column 10
Line 46, Claim 5, delete "he" and insert -- The --
Line 55, Claim 8, delete "the" and insert -- The --

Column 12
Line 4, Claim 14, delete "$Pup_T$/ sqrt($Pup_R$)," and insert -- $Pup_T$/sqrt($Pup_R$), --

Signed and Sealed this
                   Twenty-seventh Day of September, 2022

Katherine Kelly Vidal
                 *Director of the United States Patent and Trademark Office*